United States Patent
Tertzakian et al.

(10) Patent No.: US 10,657,073 B2
(45) Date of Patent: May 19, 2020

(54) DRIVER MODULE FRAMEWORK ENABLING CREATION AND EXECUTION OF RELIABLE AND PERFORMANT DRIVERS

(71) Applicant: MICROSOFT TECHNOLOGY LICENSING, LLC, Redmond, WA (US)

(72) Inventors: Augustus Javier Tertzakian, Kirkland, WA (US); Rajesh Bangalore Gururaj, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 84 days.

(21) Appl. No.: 15/963,701

(22) Filed: Apr. 26, 2018

(65) Prior Publication Data

US 2019/0332553 A1    Oct. 31, 2019

(51) Int. Cl.
*G06F 13/10* (2006.01)
*G06F 9/54* (2006.01)

(52) U.S. Cl.
CPC ............ *G06F 13/102* (2013.01); *G06F 9/546* (2013.01)

(58) Field of Classification Search
None
See application file for complete search history.

(56) References Cited

U.S. PATENT DOCUMENTS

| | | | |
|---|---|---|---|
| 5,613,123 A * | 3/1997 | Tsang | |
| 7,069,546 B2 | 6/2006 | Tsarfati | |
| 8,185,783 B2 | 5/2012 | Lee et al. | |
| 9,323,543 B2 | 4/2016 | Weinsberg et al. | |
| 2003/0101290 A1* | 5/2003 | Lin | |
| 2005/0246559 A1* | 11/2005 | Oshins | |
| 2009/0064196 A1 | 3/2009 | Richardson et al. | |

(Continued)

OTHER PUBLICATIONS

"Introduction to the WDF User Mode Driver Framework", Retrieved From: <<http://download.microsoft.com/download/5/D/6/5D6EAF2B-7DDF-476B-93DC-7CF0072878E6/UMDF_Intro.doc>>, Jun. 2, 2005, pp. 1-12.

(Continued)

*Primary Examiner* — Syed A Roni
(74) *Attorney, Agent, or Firm* — Newport IP, LLC; Michael C. Johnson; Leonard J. Hope (57) ABSTRACT

A driver module framework enables the creation and execution of drivers. The modules in a driver compatible with the framework can expose data structures, device driver specific programming patterns, devices, or hardware buses. The modules share a common interface and can include callback functions, public methods, private methods, attributes, a module-specific configuration, and a private context. Driver-specific code in a driver can cause the framework to instantiate the modules and can consume functionality provided by the modules contained therein. The framework can also enforce the use of good programming practices, including preventing the use of improper module dependencies and enforcing data hiding. The framework can also provide callbacks received from an operating system to all of the modules in a driver, which allows modules to be fully self-contained and easily reusable.

20 Claims, 7 Drawing Sheets

DISTRIBUTE CALLBACKS TO DRIVER MODULES (56) References Cited

U.S. PATENT DOCUMENTS

2009/0210888 A1    8/2009  Lee et al.
2009/0265720 A1*  10/2009  Nagampalli

OTHER PUBLICATIONS

"Using WDF to Develop a Driver", Retrieved From: <<https://docs.microsoft.com/en-us/windows-hardware/drivers/wdf/using-the-framework-to-develop-a-driver>>, Apr. 20, 2017, 19 Pages.

Amar, et al., "Generic Driver Model using hardware abstraction and standard APIs", Retrieved From: <<https://web.archive.org/web/20120318004342/https:/www.design-reuse.com/articles/18584/generic-driver-model.html>>, Mar. 18, 2012, 6 Pages.

Beningo, Jacob, "Developing Reusable Device Drivers for MCU's", In Proceedings of Embedded Systems Conference, Jul. 31, 2012, pp. 1-20.

Finseth, Steve, "Abstracting device-driver development", Retrieved From: <<https://www.embedded.com/design/configurable-systems/4024952/Abstracting-device-driver-development>>, Apr. 8, 2004, 5 Pages.

Somasundaran, Muthumani, "Android HAL and Device driver architecture", Retrieved From: <https://www.e-consystems.com/blog/system-on-module-SOM/android-hal-and-device-driver-architecture/>>, Aug. 17, 2015, 3 Pages.

Unemyr, Magnus, "Device Driver Development: The Ultimate Guide for Embedded System Developers", Retrieved From: <<http://blog.atollic.com/device-driver-development-the-ultimate-guide-for-embedded-system-developers>>, Oct. 21, 2016, 14 Pages.

* cited by examiner

DRIVER MODULE FRAMEWORK ENABLING CREATION AND EXECUTION OF RELIABLE AND PERFORMANT DRIVERS

BACKGROUND

Drivers are programs that can extend an operating system to enable support for devices that the operating system does not natively support. Drivers are tightly integrated with the operating system upon which they execute. For example, drivers typically share the same address space as the operating system and use the same primitives as the operating system. Each driver therefore, like any other part of an operating system, can affect an entire computing device and user experience. For example, when a driver crashes, all the other programs executing on the host computing device will also typically crash.

Driver programmers are confronted with myriad issues that make it difficult to create drivers that execute reliably and performantly. For instance, operating systems commonly require drivers to support very specific rules, protocols, data formats, and application programming interfaces ("APIs"). Driver programmers must, therefore, understand these complex requirements in detail. Inexperienced driver programmers might view these requirements as annoyances and obstacles to work around and, consequently, write drivers that circumvent some of the requirements, which may result in drivers that are unreliable and potentially non-performant.

Reliable and performant drivers are also difficult to write because they must often deal with many events that can happen very fast or very slowly at times, and in an unpredictable order. Moreover, drivers must process many events immediately and process some events in stages. As a result, drivers can miss events in some cases. In addition, an operating system and application programs can call into a driver at any time. Due to this complexity, it is not uncommon for drivers to include programming errors that cause race conditions, whereby a driver depends on the sequence or timing of processes or threads for it to operate properly.

Because driver development is extremely difficult, some programmers will reuse program code by copying program source code from another driver. This practice might also result in an unreliable and non-performant driver. For instance, if a programmer does not understand the copied driver source code, the resulting driver can end up containing unneeded, non-executed, or rarely executed code that serves no useful purpose and thereby reduces the performance of the driver. Code developed using these types of practices may also increase the probability of the code failing.

It is with respect to these and other technical challenges that the disclosure made herein is presented.

SUMMARY

A driver module framework (which might be referred to herein as "the DMF" or "the framework") is disclosed that enables the creation and execution of drivers that can be more reliable and performant than drivers created using current driver frameworks and development practices. In particular, the structure and operation of the framework disclosed herein prohibits the use of many of the poor driver programming practices described above that can result in unreliable and non-performant drivers.

The framework disclosed herein can increase the reliability and performance of driver modules by instantiating modules in a consistent way, maintaining only parent-child relationships between the modules, and passing operating system callbacks directly to all of the modules in a driver. The framework disclosed herein can also simplify driver development and execution by utilizing drivers consisting of modules having standard interfaces, which can also result in more reliable and performant drivers. More reliable and performant drivers might, in turn, result in better performing computing devices that utilize fewer processor cycles, less memory, and less power. Other technical benefits not specifically mentioned herein can also be realized through implementations of the disclosed subject matter.

In order to realize some or all of the technical benefits mentioned briefly above, a driver module framework is disclosed herein that enables the creation and execution of drivers consisting of modules compatible with the framework. The framework can execute in conjunction with execution of an operating system. The functionality provided by the framework might also be incorporated directly into an operating system in some implementations.

The modules in a driver compatible with the framework can provide various types of functionality including, but not limited to, exposing data structures, device-driver specific programming patterns, devices, or hardware buses. The modules in a driver share a common interface and can include callback functions, public methods, private methods, a module-specific configuration, module attributes, and a private context. Driver-specific code in a driver can cause the framework to instantiate the modules and consume functionality provided by the modules contained therein.

The framework can instantiate the modules in a driver. The framework can also create and maintain data describing relationships between the modules in a driver, such as a tree specifying parent-child relationships between modules. For example, parent modules might instantiate child modules to utilize the functionality provided by the child modules. The model attributes of a module include data identifying the module's parent module, if any.

In one implementation, the only permissible relationship between modules is a parent-child relationship. Modules cannot communicate directly with siblings of one another in this implementation. By limiting the relationships between modules to parent-child relationships, improper module dependencies are avoided. In this regard, parent and child modules can only communicate with one another via their public methods in some implementations. In these implementations, parent and child modules cannot access one another's private methods or private context and, therefore, the framework also enforces data hiding.

In one implementation, the only permissible relationship between client driver specific code and modules is such that that client driver specific code may only communicate with the modules it has instantiated (i.e. top-level modules). The client driver specific code may not communicate directly with any child module in this implementation. By only allowing driver specific code and modules to communicate with top-level parent modules, improper dependencies are avoided. In this regard, client specific code can only communicate with top-level parent modules via the modules' public methods in some implementations.

The driver and the modules can also register to receive callback notifications ("callbacks") from an operating system. When the framework receives callbacks, it provides the callbacks to all the modules in a driver that support the callbacks via their callback functions in some implementations. In this manner, each module that support the callbacks receives the callbacks independently of the other modules and can respond accordingly.

In some implementations the framework passes the callbacks directly to all the modules in a driver and then, optionally, to the driver itself. The code that a module executes to support an operating system callback is inside the module and only visible to the module and the framework. Without the utilization of the technologies disclosed herein, a driver itself must tell the module how to act when a specific operating system callback happens causing that code to be outside of the module and, in turn, causing the module to not be a complete unit of code and thus making it difficult to reuse the module reliably and easily.

As discussed briefly above, implementations of the technologies disclosed herein can provide a multitude of technical benefits including, but not limited to, more reliable and performant driver execution and conservation of computing resources such as processor cycles, memory, and power. Other technical benefits not specifically identified herein can also be realized through implementations of the disclosed technologies.

It should be appreciated that the above-described subject matter can be implemented as a computer-controlled apparatus, a computer-implemented method, a computing device, or as an article of manufacture such as a computer readable medium. These and various other features will be apparent from a reading of the following Detailed Description and a review of the associated drawings.

This Summary is provided to introduce a brief description of some aspects of the disclosed technologies in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The following detailed description is directed to a driver module framework that can enable the creation and execution of reliable and performant drivers. As discussed briefly above, implementations of the technologies disclosed herein can provide a multitude of technical benefits including, but not limited to, more reliable and performant driver execution and conservation of computing resources like processor cycles, memory, and power. Other technical benefits not specifically mentioned herein can also be realized through implementations of the disclosed subject matter.

While the subject matter described herein is presented in the general context of a driver module framework, an operating system, and a driver, those skilled in the art will recognize that other implementations might be performed in combination with other types of computing systems and modules. Those skilled in the art will also appreciate that the subject matter described herein can be practiced with other computer system configurations, including hand-held devices, multiprocessor systems, microprocessor-based or programmable consumer electronics, computing or processing systems embedded in devices (such as wearable computing devices, automobiles, home automation etc.), minicomputers, mainframe computers, and the like.

In the following detailed description, references are made to the accompanying drawings that form a part hereof, and which are shown by way of illustration specific configurations or examples. Referring now to the drawings, in which like numerals represent like elements throughout the several FIGS., aspects of a driver module framework that can enable the creation and execution of reliable and efficient drivers will be described.

Figure 1:
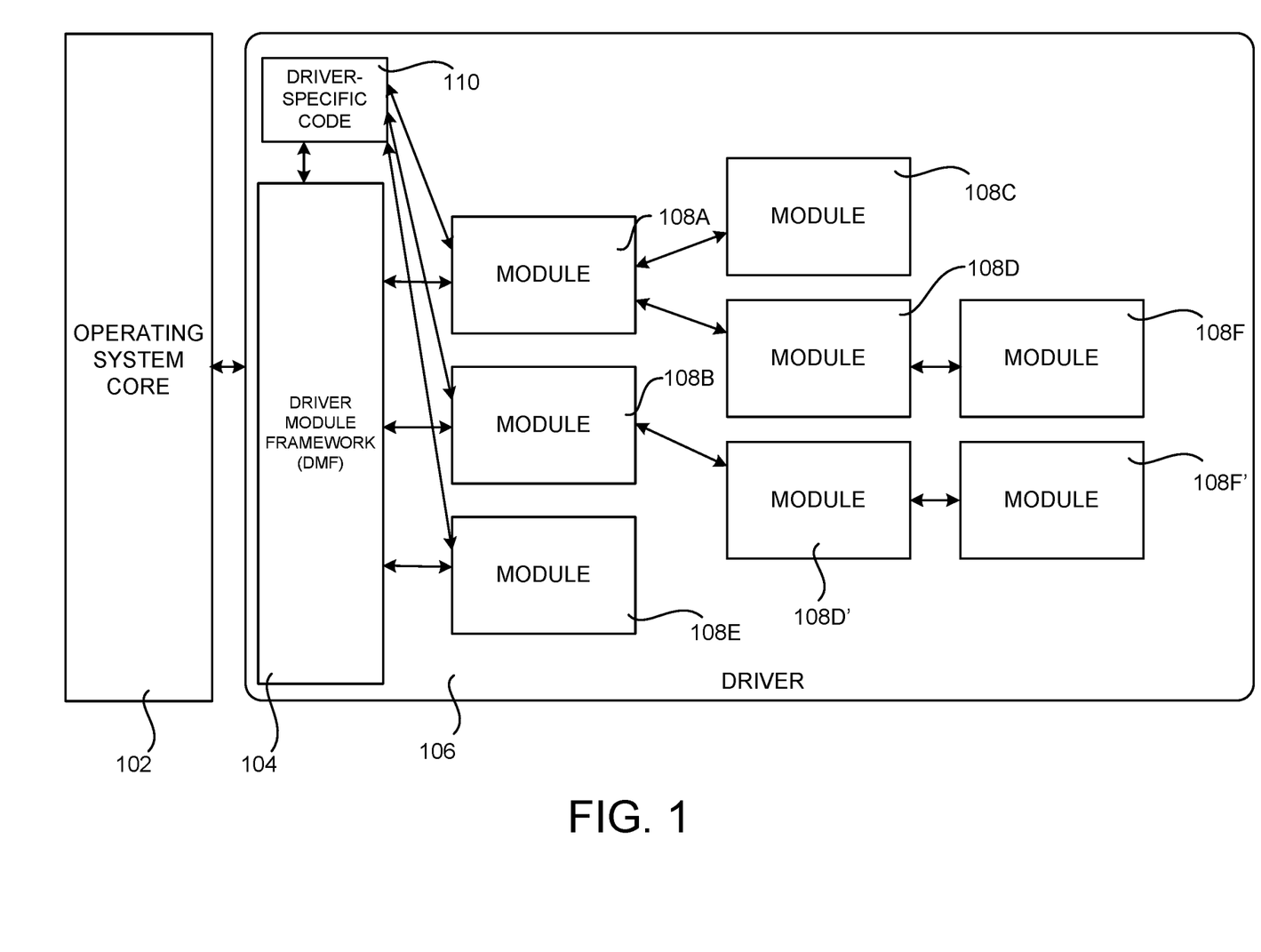
FIG. 1 is a computer software architecture diagram that shows aspects of the configuration and operation of a driver module framework.

FIG. 1 is a computer software architecture diagram that shows aspects of the configuration and operation of an operating system 102, a framework 104, and a driver 106 configured for use with the framework 104, according to one implementation disclosed herein. As discussed briefly above, a driver 106 is a program that can extend an operating system 102 to enable a computing device to support devices that the operating system 102 does not natively support.

The driver 106 is tightly integrated with the operating system 102. For example, the driver 106 might share the same address space as the operating system 102 and use the same primitives as the operating system 102. The driver 106 can be any type of device driver including, but not limited to a function driver, filter driver, bus driver, kernel mode driver, or user mode driver.

As also discussed briefly above, and in greater detail below, the framework 104 enables the creation and execution of drivers 106 consisting of modules 108 that are compatible with the framework 104. As will also be described in greater detail below, the modules 108 include their own program code and data, which are inaccessible to the driver 106 and other modules 108.

In some implementations, the framework 104 executes in conjunction with the execution of the operating system 102. The functionality provided by the framework 104 might also be incorporated directly into the operating system 102 in some implementations. The framework 104 can also interact with and utilize functionality provided by other driver-related frameworks in some implementations.

The illustrative driver 106 shown in FIG. 1 includes modules 108A-108F' that have been configured for compatibility with the framework 104. Other drivers 106 can include more or fewer modules 108 than shown in FIG. 1.

FIG. 1 also illustrates that the driver specific code 110 is only able to communicate directly with the modules 108 that the driver 106 has created (i.e. top-level modules). The driver specific code 110 has no access to any of the child modules in the tree of module created by the framework. Specifically, in FIG. 1, the driver specific code 110 can only communicate with the modules 108A, 108B and 108E. Use of the disclosed framework enforces such an architecture, which enables the creation and execution of drivers 106 that can be more reliable and performant than drivers created using current driver frameworks and development practices.

The modules 108 in a driver 106 compatible with the framework 104 can provide various types of functionality including, but not limited to, exposing data structures, device driver-specific programming patterns, devices, or hardware buses. Examples of these module types are provided below. Modules 108 providing data structure functionality can include, but are not limited to, the module 108 types described below.

Data Structure Modules

A Buffer List Module 108 provides a list of zero or more pre-allocated buffers. The buffers each have an optional client context. The buffers also have program code to guard against buffer overruns. This program code performs a check when the buffer is used so that when an overrun error happens it can be immediately detected. Each buffer can be added to the list in such a way that it is automatically removed from the list after a certain time, on a buffer by buffer basis. The list can be backed up by an optional lookaside list that can allocate buffers when the list of buffers becomes empty and new buffers are needed.

A Dual Buffer module 108 provides a "ping-pong" buffer that allows the driver 106 to easily parse unstructured data into packets where one buffer (i.e. ping) holds the last full buffer and the other buffer (i.e. pong) holds the current incomplete buffer. The driver 106 can read from the complete buffer while another part of the driver code continues populating the incomplete buffer.

A FIFO module 108 provides a first-in first-out ("FIFO") data structure. The number of FIFO entries as well as the size of each entry is provided by the driver 106. Additional enhancements include an "infinite" mode that automatically removes the oldest FIFO element when a new element is added to a full FIFO. Also, each record of the FIFO can be populated from a table of addresses and lengths. This is useful when reading/writing structures such as protocol headers where a single copy into the FIFO element's buffer is not sufficient. Also, there is a public method that allows the driver 106 to enumerate all the FIFO elements and, optionally, perform an operation on elements in the FIFO.

A Hash Table module 108 provides a traditional hash table. The size of the table as well as the size of each record is defined by the driver 106.

A Producer Consumer List module 108 is composed of two instances of the Buffer List module 108 described above. The first instance is a list of pre-allocated empty buffers (the "producer") and the other is an empty list (the "consumer"). This module is can be used when a driver 106 needs to create a work queue. When the driver 106 has work to add to the queue, the driver 106 removes a pre-allocated buffer from the producer, populates it with the work to be done and writes the buffer to the consumer list. Later, the buffer is removed the from the consumer list, the indicated work is completed, and the buffer is returned to the producer list. Since this data structure is built using the Buffer List module, all operations are bounds checked to detect corruption.

Driver Pattern Modules

Modules 108 providing driver patterns can include, but are not limited to, the module 108 types described below. A Crash Dump module 108 allows the driver 106 to easily write data to a crash dump file when a computing system crashes. This module 108 exposes a FIFO so that the driver 106 can write data to the FIFO at different checkpoints. Older data is automatically removed when the FIFO becomes full. If the system crashes, the entire FIFO is reordered so that the earliest entry is listed first. Then, the entire FIFO is written to the crash dump file. Optionally, the driver 106 can write other data to the crash dump file.

A Deferred Call module 108 provides functionality allowing code to execute at a later time in a deterministic manner. Deferred calls executed by this module support the following: 1) the deferred call will execute exactly the number of times that the driver 106 has enqueued it. The driver 106 does not need to track if the deferred call was already enqueued. The module 108 determines whether the deferred call was already enqueued; 2) The order in which the deferred calls happen is the order in which the calls are enqueued; and 3) the driver 106 may wait for the deferred call to execute without explicitly creating and setting an event.

An Interruptible Delay module 108 allows a driver 106 to cause a thread to sleep. However, the driver 106 can cancel that sleep at any time.

An Input/output Control ("IOCTL") Handler module 108 allows the driver 106 to create a table of all supported IOCTLs, including the minimum sizes of the input/output buffers. Each record can also specify a callback function as well as the required user-mode access rights. The IOCTL Handler module 108 retrieves the input/output buffers, validates them, optionally validates access rights and then, if all the validations succeed, the corresponding callback function is called. The callback function can directly use the input/output buffers. In the case where the minimum buffer sizes are variable, the callback function can validate the length. Finally, the callback function can return "status pending" to indicate that the request (by another program or driver) is held by the driver 106. Otherwise, the module 108 automatically completes the request after the callback function executes.

A Kernel User Event module 108 allows the driver 106 to set up an event in kernel-mode that is also accessible in user-mode. This module 108 saves the driver 106 from having to write code that is duplicated often.

A Notification Stream module 108 allows the driver 106 to specify the globally unique identifier ("GUID") of a device interface. The module 108 registers to receive a Plug-n-Play ("PnP") notification when that device interface appears or disappears. When the device interface appears, the module 108 automatically opens the corresponding target device. When the device interface disappears, the Notification Stream module 108 automatically closes the corresponding target device. Methods are provided that allow the driver 106 to send/receive requests to that target. Furthermore, it is possible to set up a stream of asynchronous requests that are automatically created, sent, and received to and from the target device.

A Registry module 108 includes functions that allow the driver 106 to work easily with a registry, such as that utilized by the WINDOWS operating system. This module 108 has methods that allow the driver 106 to specify various conditions under which operations that depend on registry entries will occur. It also allows the driver 106 to easily query and validate registry entries using a single line of code. Furthermore, it has functions that allow the driver 106 to write an entire tree of registry entries listed in a table.

A Request Stream module 108 allows the driver 106 to communicate with an underlying target device. Two modes are supported in one implementation: 1) the driver 106 can either call synchronous routines using input/output buffers; or 2) the driver 106 can specify the number of asynchronous operations that are automatically created, sent, or received to or from the underlying target device. In the second case, the driver 106 specifies the sizes of the input/output buffers. The Request Stream module 108 creates the buffers as specified. Then, prior to sending an input buffer to the target device, the driver's input buffer callback function is called where the driver 106 populates the input buffer that is sent. When an output buffer is received, it is sent to the driver's 106 output buffer callback function where the driver 106 may retrieve the contents of the output buffer.

A Run Once module 108 allows the driver 106 to specify that an operation should happen a single time, either for the lifetime of a computing device or for the current boot cycle. Options can be specified for retrying the operation in case of failure or success. This module 108 takes care of all the housekeeping tasks needed to perform the required functionality. For example, the module 108 can remember that an operation has occurred on a computing device by writing a flag to a registry or other type of similar location and automatically reading that same flag every time the module 108 is instantiated.

A Self Target module 108 allows a driver 106 to send a request to its own stack. This can be used in some cases to cause a request to be processed by filter drivers or other drivers in stack.

A Serial I/O Stream module 108 allows the driver 106 to specify the parameters of a serial I/O stream target device (a target device that processes bits serially) to open. Then, it provides public methods that expose the functionality of a request stream to that serial I/O stream target.

A Thread module 108 allows a driver 106 to specify that a callback function is called whenever there is work for that callback function to perform. This module 108 creates a thread and two events: 1) a stop event that tells the thread when it should stop; and 2) a work event that indicates when work needs to be done. The thread waits on the two events. When the work event is set, the driver's callback function is called so that the driver 106 can do work. A public method is provided that tells the module 108 that work is ready to be done.

A User Mode Event module 108 allows a driver 106 to enqueue a specific number of requests that are sent to the driver 106 via an IOCTL. When the driver 106 is ready to complete the requests (because an event has occurred in the driver 106 for instance), a callback function is called for each pending request where the driver 106 can populate the output buffer and complete the request. This programming pattern is useful when a driver 106 wants to notify user-mode programs of events asynchronously.

A WINDOWS Management Interface ("WMI") API module 108 allows the driver 106 work with the WMI API provided by the WINDOWS operating system.

A Work Stream module 108 uses a thread and a list of producers and consumers to allow a driver 106 to insert work into a work queue via multiple threads. When a driver 106 calls the public method to add work to the work queue, a buffer is removed from the producer list. The buffer is then populated with the work to be done and the buffer is added to the consumer list. The thread's work ready event is then set. The corresponding thread callback function is called. That function retrieves the work to be done from the consumer list and calls the driver 106 callback function. That function does the work specified. Finally, the buffer is returned to the producer list. Options are provided for a caller's threads to wait for the work to be completed or the work can be completed asynchronously. This can ensure that all work is done in order of being requested, one operation at a time.

Hardware Modules

The modules 108 providing hardware-related functionality can include, but are not limited to, the module 108 types describe below. A Button Target via MICROSOFT General Purpose I/O ("GPIO") module 108 allows the driver 106 to communicate with the device interfaces exposed by the GPIO driver in the WINDOWS operating system. These interfaces allow the driver 106 to inject button and tablet related messages.

A GPIO module 108 module 108 allows the driver 106 to communicate with the GPIO pins exposed by GPIO target device. This module 108 automatically looks for the GPIO resources and opens the appropriate targets based on settings set by the driver 106.

A Human Interface Device ("HID") module 108 allows the driver 106 to communicate with an underlying HID target device. Public methods are provided that allow the driver 106 to work with input/output/feature reports. This module 108 automatically opens HID target devices as they appear. It queries each one to determine if it matches parameters specified by the driver 106. If so, the module 108 opens that WDFIOTARGET and prepares it for use by the driver 106.

An I2C VIA SPB module 108 allows the driver 106 to communicate with an I2C bus that is exposed by a Small Peripheral Device ("SPD"). The driver 106 specifies the desired bus index. Public methods are provided that allow the driver 106 to read/write I2C data.

A Notification Via ACPI module 108 allows a driver 106 to register for and receive asynchronous notifications via the Advanced Configuration and Power Interface ("ACPI"). The driver 106 specifies the type of notification desired, the callback function the module 108 should call when the notification happens and the interrupt request level ("IRQ") level at which the callback function is called.

A Notifier Via ACPI module 108 allows a driver 106 to query ACPI in various ways. This module 108 allows the driver 106 to easily query/invoke/evaluate Device-Specific Methods ("DSM") methods.

A Resource Hub module 108 allows the driver 106 to communicate with a resource hub target device. The module 108 contains all the code need to parse the type resource and other information.

A System Management Basic Input/Output System ("SMBIOS") WIN WMI module 108 allows the driver 106 to read the SMBIOS data which the module 108 retrieves using WMI.

A SPI via SPB module 108 allows the driver 106 to communicate with an SPI bus that is exposed by SPB. The driver 106 specifies the desired bus index. Public methods are provided that allow the driver 106 to read/write SPI data.

A Virtual HID Device VHF module 108 is a wrapper around the Virtual HID Framework ("VHF") API provided by the WINDOWS operating system. Modules 108 use this module 108 as a child module 108 to create virtual HID devices. The parent modules 108 expose public methods that are specific to that virtual HID device.

A Branch Track module 108 provides an API that allows the driver 106 to annotate branches of code in a driver. These annotations are useful for test and validation purposes.

Figure 2:
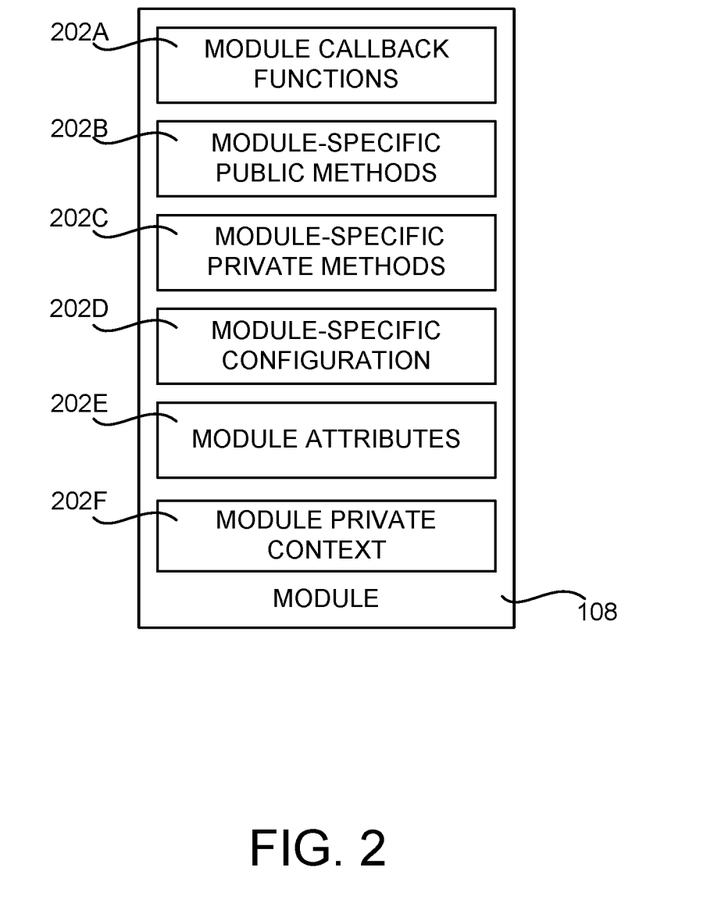
FIG. 2 is data structure diagram that shows aspects of one format for a module configured to execute in conjunction with the driver module framework shown in FIG. 1.

Referring momentarily to FIG. 2, a data structure diagram will be described that shows aspects of one illustrative structure for a module 108 configured to execute in conjunction with the framework 104 shown in FIG. 1, according to one implementation. As shown in FIG. 2, modules 108 that are compatible with the framework 104 share a common interface and can include callback functions 202A, module-specific public methods 202B ("public methods"), module-specific private methods 202C ("private methods"), a module-specific configuration 202D, module attributes 202E, and a module private context 202F ("private context"). Each of these components of a framework-compatible module 108 will be described in detail below.

The callback functions 202A are module-specific functions that the framework 104 or driver 106 calls when callbacks are received from the operating system 102. In order to enable this functionality, the driver 106 and the modules 108 can register to receive callback notifications ("callbacks") from the operating system 102 at the time they are instantiated. For example, and without limitation, the modules 108 might register to receive Plug-and-Play ("PnP") power event callbacks, PnP power policy callbacks, file object event callbacks, or other types of callbacks. This aspect allows all code related to a module's operation and function to reside inside the module in a self-contained unit.

When the framework 104 receives callbacks from the operating system 102, the framework 104 dispatches the callbacks to all of the instantiated modules 108 in a driver 106 by calling the module's corresponding callback functions 202A in some implementations. In this manner, every module 108 in a driver 106 receives the callbacks independently of the other modules 108 in the driver 106 and can respond accordingly.

In some implementations the framework 104 dispatches the callbacks directly to all of the modules 108 in a driver 106 and then, optionally, to the driver 106 itself. Additional details regarding the distribution of callbacks to the modules 108 in a driver 106 will be provided below with regard to FIGS. 4 and 5.

The public methods 202B of a module 108 are methods that are exposed to other modules 108 and the driver 106. Modules 108 and the driver 106 can call the public methods 202B of a module 108 to access the functionality provided by that module 108. Calls to the public methods 202B of module can include module-specific parameters. Calls to public methods pass a properly instantiated module handle ensuring that the module is properly prepared for the call. Thus, the module can synchronize external calls with its own functional requirements.

Modules 108 cannot access the private methods 202C, private context 202F (described below), or other internal functions or data structures of other modules 108. If a module 108 does not have public methods 202B, then the driver 106 and the other modules 108 cannot interact with the module 108. This restriction enables the framework 104 to enforce data hiding and eliminates the possibility of inappropriate cross-module data or code sharing utilized in some previous driver development practices which can result in unreliable or non-performant drivers.

As will be described in greater detail below, the framework 104 also maintains data identifying a relationship between the modules 108. For example, the framework 104 might maintain a tree data structure describing a parent-child relationship between two or more modules 108.

In these implementations, the framework 104 also restricts communication between modules 108 to communication between parent and child modules 108. Modules 108 that do not share a parent-child relationship cannot communicate with one another. This restriction can eliminate the improper module dependencies created by some previous driver development practices that result in unreliable or non-performant drivers. When two or more modules work together to perform functions, a parent module instantiates the modules that work together and it synchronizes the operations of its child modules.

As shown in FIG. 2, each module 108 can also include one or more private methods 202C. The private methods 202C implement the actual functionality provided by a module 108. The private methods 202C can be called by the callback functions 202A, private methods 202C or public methods 202B of a module 108.

A module's private methods 202C are not accessible to other modules 108. As in the case of the public methods 202B, the use of completely private methods 202C to implement the functionality provided by a module 108 enables the framework 104 to enforce data hiding and eliminates the possibility of inappropriate cross-module data or code sharing utilized in some previous driver development practices that result in unreliable or non-performant drivers.

Each module 108 in a driver 106 can also include a module-specific configuration 202D. The module-specific configuration 202D includes data that defines how a module 108 is to initialize itself using module-specific parameters.

Each module 108 in a driver 106 can also include one or more module attributes 202E. The module attributes 202E can be utilized to store various types of information about a module 108. For example, and without limitation, the module attributes 202E can include data identifying a module's parent module 108 in some configurations. Generally, these attributes include settings for modules that are common to all modules. These are different than the module-specific configuration 202D described above, which is specific to particular modules.

The private context 202F of a module 108 is a data structure that contains the data that the module 108 utilizes while the module is instantiated. Each module 108 utilizes its private context 202F to store data for managing its own state. A module's private context 202F is only accessible and visible to the module 108 itself. Neither the driver 106 nor the other modules 108 in a driver 106 can access a module's private context 202F. This restriction also enforces data hiding as described above.

Referring back to FIG. 1, additional details regarding the operation of the illustrative driver 106 shown in FIG. 1 and its constituent modules 108 will be provided. The framework 104 can instantiate the modules 108 in a driver 106. Modules 108 can also instantiate other modules 108. For example, parent modules 108 might instantiate one or more other modules 108 (i.e. child modules 108) to utilize, enhance or change the functionality provided by the child modules 108.

In the example shown in FIG. 1, for instance, the driver 106 has instantiated the modules 108A, 108B, and 108E. The module 108A, in turn, has instantiated a child module 108C and another child module 108D. The module 108D has instantiated a child module 108 of its own, the module 108F. Similarly, the module 108B has instantiated the child module 108D', which is another instance of the child module 108D. The module 108D' has instantiated the module 108F', which is another instance of the module 108F.

As mentioned briefly above, the modules 108 in a driver 106 can only have parent-child relationships with one another in some implementations. Sibling relationships are not permitted in these implementations. In the example driver 106 shown in FIG. 1, for instance, the modules 108A, 108B, and 108E are children of the driver 106 itself. The module 108C is the child of the module 108A. The module 108F is the child of module 108D which, in turn, is the child of module 108A. Similarly, the module 108F' is a second instance of the module 108F and is a child of the module 108D', which is another instance of the module 108D. The module 108D' is a child of the module 108B.

The framework 104 can also create and maintain data describing the relationships between the modules 108 in a driver 106, such as a tree specifying parent-child relationships between modules. For instance, the framework 104 might maintain a tree data structure, or another type of data structure, that describes the parent-child relationships between the modules 108A-108F' shown in FIG. 1 and described above.

Driver-specific code 110 in a driver 106 can cause the framework 104 to instantiate the modules 108 and can consume functionality provided by the modules 108 contained therein. A driver 106 cannot, however, utilize framework-compatible modules 108 unless the modules 108 are properly instantiated by the framework 104. Additionally, and as described above, all modules 108 are instantiated in the same manner.

In some configurations, the driver-specific code 110 only instantiates the modules 108 and does not need more driver-specific code. The modules 108 in this case perform their functionality without knowledge of the other modules 108 because there is no driver context. The driver-specific code 110 can be located inside or outside of a module 108.

The modules 108 are responsible for locking their own data using locks, which can be provided by the framework 104. Each module 108 is also responsible for handling the asynchronous appearance and disappearance of its own resources. Additional details regarding the operation of the framework 104, the driver 106, and the modules 108 will be provided below with regard to FIG. 3.

Figure 3:
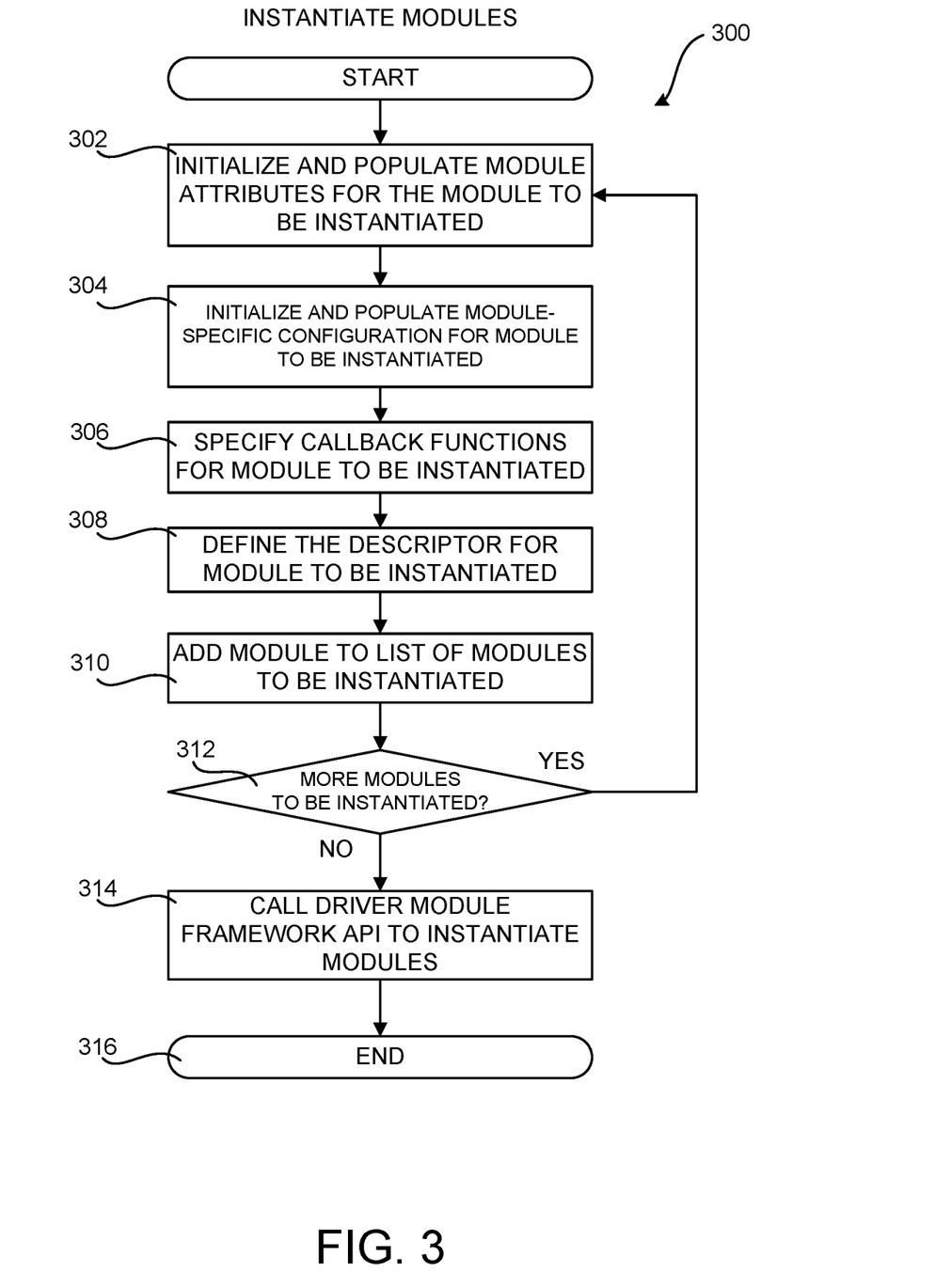
FIG. 3 is a flow diagram showing a routine that illustrates aspects of the operation of the driver module framework described with reference to FIG. 1 for instantiating modules, such as those shown in FIGS. 1 and 2.

FIG. 3 is a flow diagram showing a routine 300 that illustrates aspects of the operation of the framework 104 described with reference to FIG. 1 for instantiating modules 108, such as those shown in FIGS. 1 and 2, according to one implementation disclosed herein. It should be appreciated that the logical operations described herein with regard to FIG. 3, and the other FIGS., can be implemented (1) as a sequence of computer implemented acts or program modules running on a computing device and/or (2) as interconnected machine logic circuits or circuit modules within a computing device.

The particular implementation of the technologies disclosed herein is a matter of choice dependent on the performance and other requirements of the computing device. Accordingly, the logical operations described herein are referred to variously as states, operations, structural devices, acts, or modules. These states, operations, structural devices, acts and modules can be implemented in hardware, software, firmware, in special-purpose digital logic, and any combination thereof. It should be appreciated that more or fewer operations can be performed than shown in the FIGS. and described herein. These operations can also be performed in a different order than those described herein.

The routine 300 begins at operation 302, where a driver 106 or a module 108 initializes and populates the module attributes 202E for the module 108 to be instantiated. As discussed above, the module attributes 202E contains data describing aspects of a module 108 including, but not limited to, data identifying the module's parent module 108.

From operation 302, the routine 300 proceeds to operation 304, where a driver 106 or module 108 initializes and populates the module-specific configuration 202D for the module 108 to be instantiated. As discussed above, the module-specific configuration 202D includes configuration data utilized by a module 108 to configure aspects of its operation. From operation 304, the routine 300 proceeds to operation 306.

At operation 306, a driver 106 or module 108 specifies the callback functions 202A for the module 108 to be instantiated. A driver 106 or module 108 also defines a descriptor for the module 108 to be instantiated at operation 308. The routine 300 then proceeds from operation 308 to operation 310.

Once the attributes 202E, module-specific configuration 202D, callback functions 202A, and descriptor for the module 108 to be instantiated have been initialized and populated, the routine 300 proceeds to operation 312. At operation 310, the driver 106 or module 108 adds the module 108 to a list of modules 108 to be instantiated by the framework 104. The routine 300 then proceeds from operation 310 to operation 312.

At operation 312, the driver 106 or module 108 determines if additional modules 108 are to be instantiated. If so, the routine 300 proceeds from operation 312 back to operation 302, where the operations described above can be repeated for the next module 108 to be instantiated. If no additional modules 108 remain, the routine 300 proceeds from operation 312 to operation 314.

At operation 314, the driver 106 or module 108 calls an API exposed by the framework 104 to instantiate the modules 108 defined at operations 302-312. In response thereto, the framework 104 instantiates the modules 108. The routine 300 then proceeds from operation 314 to operation 316, where it ends.

Figure 4:
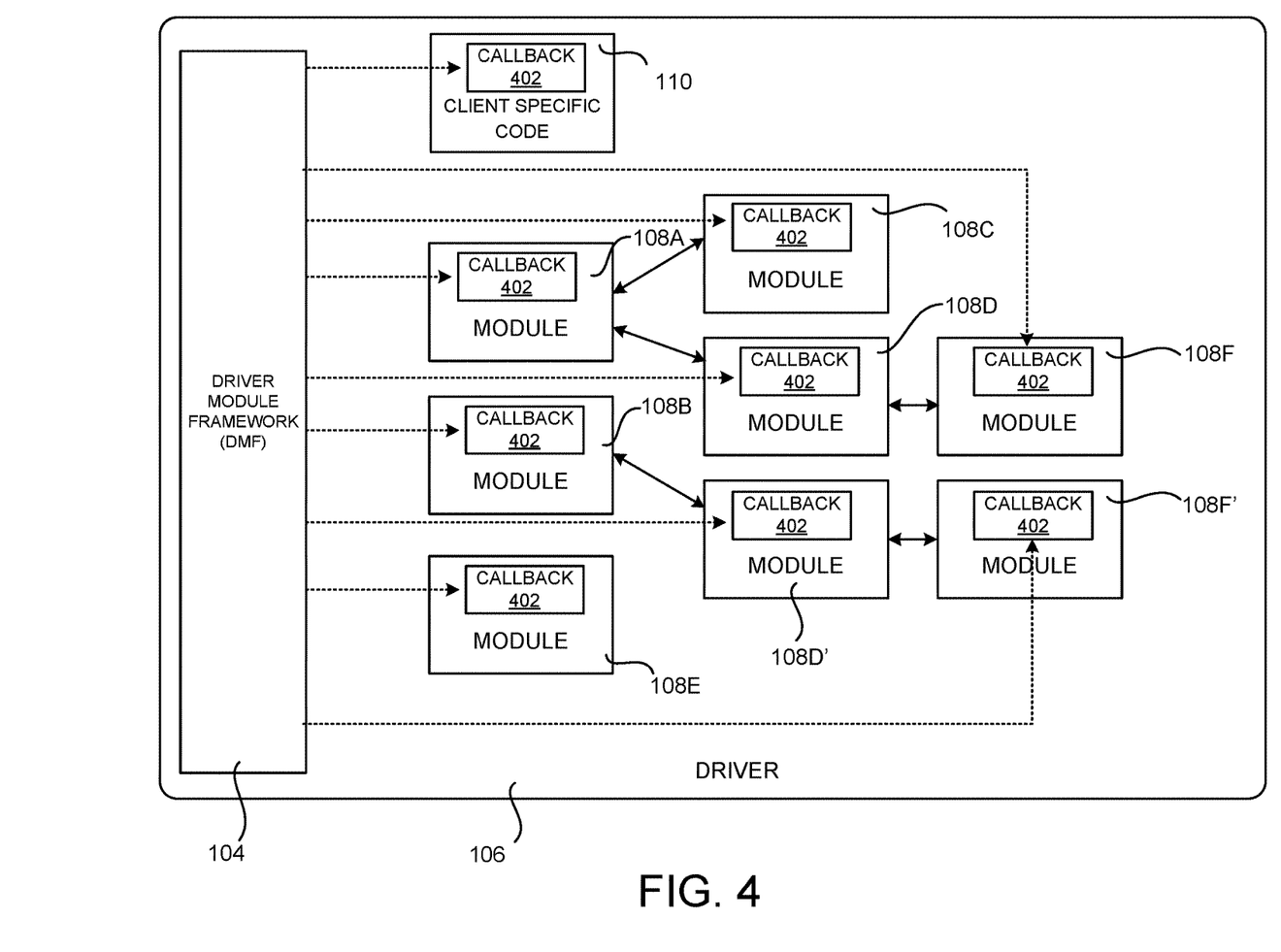
FIG. 4 is a computer software architecture diagram that shows additional aspects of the operation of the driver module framework shown in FIG. 1 for providing callbacks to the modules in a driver.

FIG. 4 is a computer software architecture diagram that shows additional aspects of the operation of the framework 104 shown in FIG. 1 for providing callbacks 402 to the modules 108 in a driver 106, according to one implementation disclosed herein. As described briefly above, the driver 106 and the modules 108 can register callback functions 202A for receiving callbacks 402 from the operating system 102 at the time they are instantiated. For example, and without limitation, the modules 108 might register to receive PnP power event callbacks, PnP power policy callbacks, file object event callbacks, or other types of callbacks. This architecture allows modules to be fully self-contained with code and data that can be manipulated via callbacks from the operating system that the module receives directly without action from a driver 106.

When the framework 104 receives callbacks 402 from the operating system 102, the framework 104 dispatches the callbacks 402 to all of the modules 108 in a driver 106 that support the callbacks by calling one or more of their callback functions 202A in some implementations. In this manner, every module 108 in a driver 106 that supports the callbacks receives the callbacks 402 and can respond independently of the other modules 108 in the driver 106. In some implementations, the framework 104 dispatches the callbacks 402 directly to all of the modules 108 that support the callbacks in a driver 106 and then to the driver itself.

The order in which the framework 104 passes the callbacks 402 to the modules 108 can change depending upon various conditions. For example, and without limitation, when a device is powering down, the callbacks 402 can be provided to the child modules 108 first and subsequently to parent modules 108. When a device is powering up, the callbacks 402 can be provided first to the parent modules 108 and subsequently to child modules 108. The callbacks 402 can be provided to the modules 108 in other sequences in other implementations.

Figure 5:
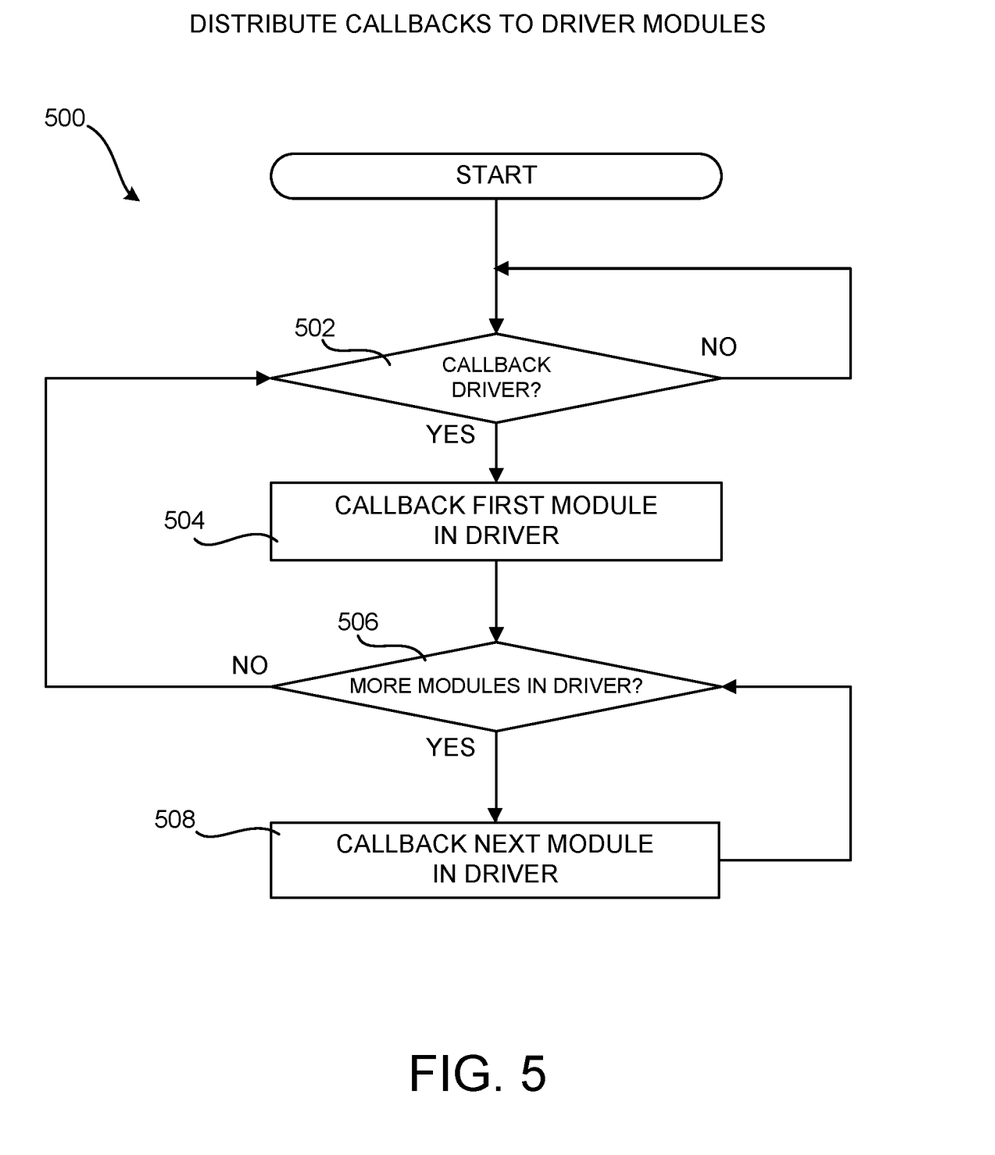
FIG. 5 is a flow diagram showing a routine that illustrates aspects of the operation of the driver module framework described with reference to FIGS. 1 and 4 for providing callbacks to the modules in a driver.

FIG. 5 is a flow diagram showing a routine that illustrates aspects of the operation of the framework 104 described with reference to FIGS. 1-4 for distributing callbacks 402 to all of the modules 108 in a driver 106 that support the callbacks 402, according to one implementation disclosed herein. The routine 500 begins at operation 502, where the framework 104 receives a callback 402 from the operating system 102. When a callback 402 has been received at the framework 104, the routine 500 proceeds from operation 502 to operation 504.

At operation 504, the framework 104 calls the appropriate callback function 202A of one of the modules 108 in the driver 106 that supports the callback. As discussed above, the first module 108 to receive a callback 402 can vary depending upon various circumstances. Once the callback 402 has been provided to the first module 108 in the driver 106, the routine 500 proceeds from operation 504 to operation 506. It is not mandatory that all callbacks are supported by all modules. If a module does not support a callback, then that callback is not sent to that module.

At operation 506, the framework 104 determines if there are additional modules 108 in the driver 106 to which the callback 402 is to be provided. If no additional modules 108 remain to be provided the callback 402, the routine 500 proceeds back to operation 520, where the processing described above can be repeated.

If the callback 402 needs to be provided to other modules 108 in the driver 106, the routine 500 proceeds from operation 506 to operation 508, where the framework 104 calls the appropriate callback function 202A of the next module 108 that supports the callback in the driver 106. The routine 500 then proceeds back to operation 506, where a determination can again be made as to whether the callback 402 is to be provided to other modules 108 in the driver 106. These operations can repeat until the callback 402 has been provided to all of the modules 108 in a driver 106.

Figure 6:
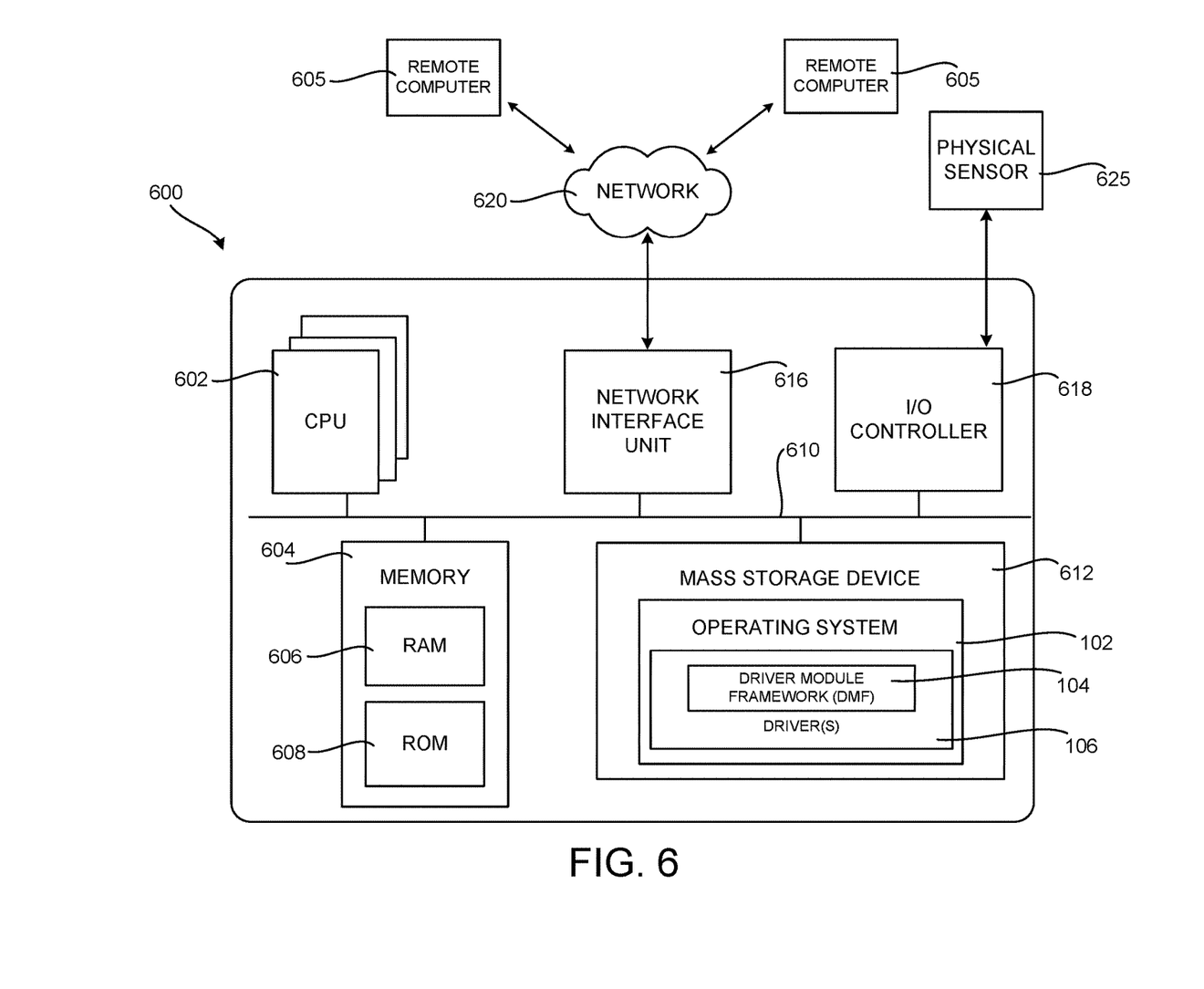
FIG. 6 is a computer architecture diagram showing an illustrative computer hardware and software architecture for a computing device that can execute the driver module framework and associated modules, such as those described with regard to FIGS. 1-5.

FIG. 6 is a computer architecture diagram showing an illustrative computer hardware and software architecture for a computing device that can execute the driver module framework 104 and associated modules 108, such as those described above with regard to FIGS. 1-5, according to one implementation. In particular, the architecture illustrated in FIG. 6 can be utilized to implement a server computer, mobile phone, an e-reader, a smartphone, a desktop computer, an AR/VR device, a tablet computer, a laptop computer, or another type of computing device.

The computer 600 illustrated in FIG. 6 includes a central processing unit 602 ("CPU" or "processor"), a system memory 604, including a random-access memory 606 ("RAM") and a read-only memory ("ROM") 608, and a system bus 610 that couples the memory 604 to the CPU 602. A basic input/output system ("BIOS" or "firmware") containing the basic routines that help to transfer information between elements within the computer 600, such as during startup, can be stored in the ROM 608. The computer 600 further includes a mass storage device 612 for storing an operating system 102, the DMF 104, drivers 106, application programs, and other types of programs. The mass storage device 612 can also be configured to store other types of programs and data.

The mass storage device 612 is connected to the CPU 602 through a mass storage controller (not shown in FIG. 6) connected to the bus 610. The mass storage device 612 and its associated computer readable media provide non-volatile storage for the computer 600. Although the description of computer readable media contained herein refers to a mass storage device, such as a hard disk, CD-ROM drive, DVD-ROM drive, or USB storage key, it should be appreciated by those skilled in the art that computer readable media can be any available computer storage media or communication media that can be accessed by the computer 600.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, radio frequency, infrared and other wireless media. Combinations of the any of the above should also be included within the scope of computer readable media.

By way of example, and not limitation, computer storage media can include volatile and non-volatile, removable and non-removable media implemented in any method or technology for storage of information such as computer readable instructions, data structures, program modules or other data. For example, computer storage media includes, but is not limited to, RAM, ROM, EPROM, EEPROM, flash memory or other solid-state memory technology, CD-ROM, digital versatile disks ("DVD"), HD-DVD, BLU-RAY, or other optical storage, magnetic cassettes, magnetic tape, magnetic disk storage or other magnetic storage devices, or any other computer storage medium that can be used to store the desired information and which can be accessed by the computer 600. For purposes of the claims, the phrase "computer storage medium," and variations thereof, does not include waves or signals per se or communication media.

According to various configurations, the computer 600 can operate in a networked environment using logical connections to remote computers through a network such as the network 620. The computer 600 can connect to the network 620 through a network interface unit 616 connected to the bus 610. It should be appreciated that the network interface unit 616 can also be utilized to connect to other types of networks and remote computer systems. The computer 600 can also include an input/output controller 618 for receiving and processing input from a number of other devices, including a keyboard, mouse, touch input, an electronic stylus (not shown in FIG. 6), or a physical sensor such as a video camera. Similarly, the input/output controller 618 can provide output to a display screen or other type of output device (also not shown in FIG. 6).

It should be appreciated that the software components described herein, when loaded into the CPU 602 and executed, can transform the CPU 602 and the overall computer 600 from a general-purpose computing device into a special-purpose computing device customized to facilitate the functionality presented herein. The CPU 602 can be constructed from any number of transistors or other discrete circuit elements, which can individually or collectively assume any number of states. More specifically, the CPU 602 can operate as a finite-state machine, in response to executable instructions contained within the software modules disclosed herein. These computer-executable instructions can transform the CPU 602 by specifying how the CPU 602 transitions between states, thereby transforming the transistors or other discrete hardware elements constituting the CPU 602.

Encoding the software modules presented herein can also transform the physical structure of the computer readable media presented herein. The specific transformation of physical structure depends on various factors, in different implementations of this description. Examples of such factors include, but are not limited to, the technology used to implement the computer readable media, whether the computer readable media is characterized as primary or secondary storage, and the like. For example, if the computer readable media is implemented as semiconductor-based memory, the software disclosed herein can be encoded on the computer readable media by transforming the physical state of the semiconductor memory. For instance, the software can transform the state of transistors, capacitors, or other discrete circuit elements constituting the semiconductor memory. The software can also transform the physical state of such components in order to store data thereupon.

As another example, the computer readable media disclosed herein can be implemented using magnetic or optical technology. In such implementations, the software presented herein can transform the physical state of magnetic or optical media, when the software is encoded therein. These transformations can include altering the magnetic characteristics of particular locations within given magnetic media. These transformations can also include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer 600 in order to store and execute the software components presented herein. It also should be appreciated that the architecture shown in FIG. 6 for the computer 600, or a similar architecture, can be utilized to implement other types of computing devices, including hand-held computers, video game devices, embedded computer systems, mobile devices such as smartphones, tablets, and AR/VR devices, and other types of computing devices known to those skilled in the art. It is also contemplated that the computer 600 might not include all of the components shown in FIG. 6, can include other components that are not explicitly shown in FIG. 6, or can utilize an architecture completely different than that shown in FIG. 6.

Figure 7:
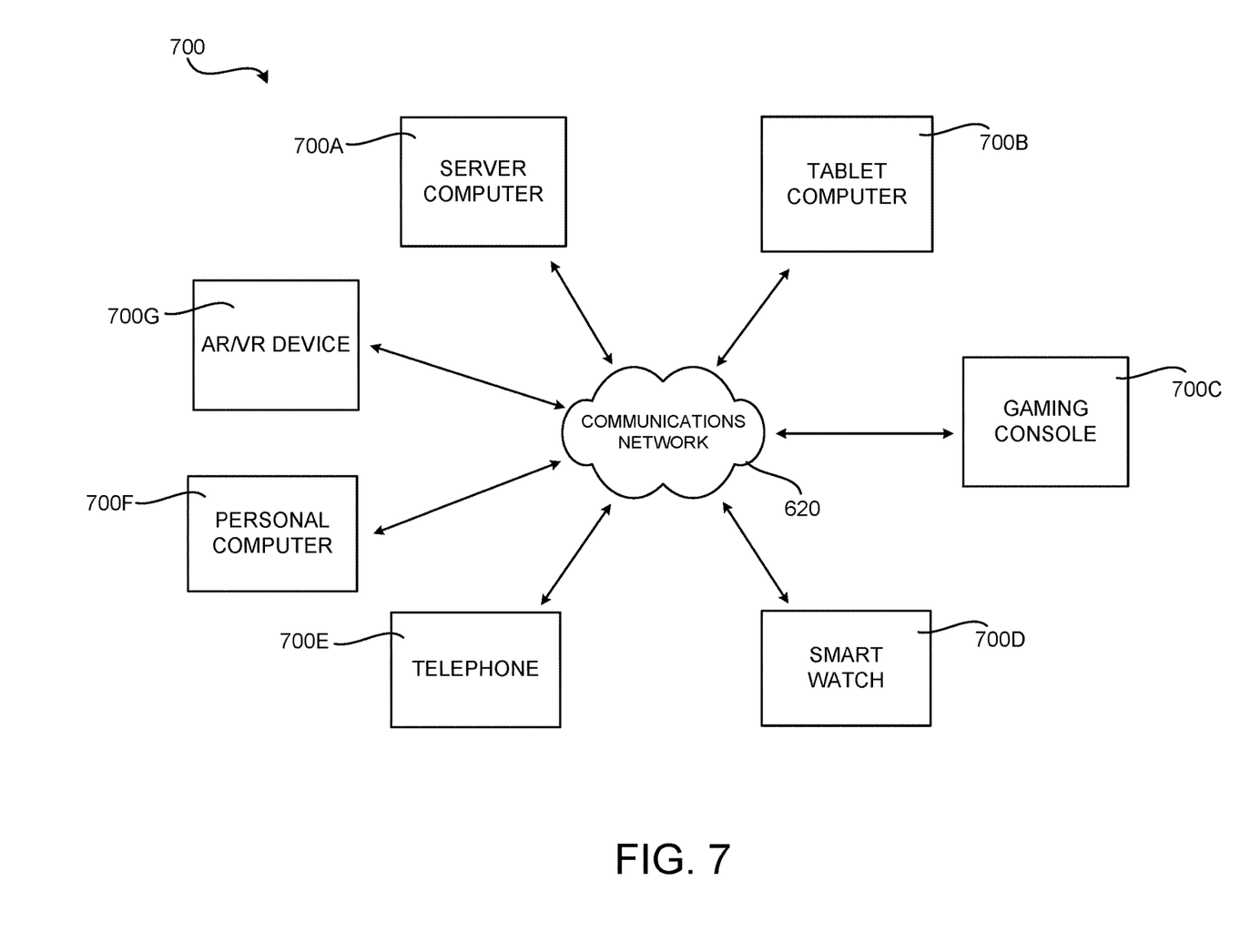
FIG. 7 is a network diagram illustrating a distributed computing environment in which aspects of the disclosed technologies can be implemented.

FIG. 7 is a network diagram illustrating a distributed network computing environment 700 in which aspects of the disclosed technologies can be implemented, according to various implementations presented herein. As shown in FIG. 7, one or more server computers 700A can be interconnected via a communications network 620 (which may be either of, or a combination of, a fixed-wire or wireless LAN, WAN, intranet, extranet, peer-to-peer network, virtual private network, the Internet, Bluetooth communications network, proprietary low voltage communications network, or other communications network) with a number of client computing devices such as, but not limited to, a tablet computer 700B, a gaming console 700C, a smart watch 700D, a telephone 700E, such as a smartphone, a personal computer 700F, and an AR/VR device 700G.

In a network environment in which the communications network 620 is the Internet, for example, the server computer 700A can be a dedicated server computer operable to process and communicate data to and from the client computing devices 700B-700G via any of a number of known protocols, such as, hypertext transfer protocol ("HTTP"), file transfer protocol ("FTP"), or simple object access protocol ("SOAP"). Additionally, the networked computing environment 700 can utilize various data security protocols such as secured socket layer ("SSL") or pretty good privacy ("PGP"). Each of the client computing devices 700B-700G can be equipped with an operating system operable to support one or more computing applications or terminal sessions such as a web browser (not shown in FIG. 7), or other graphical user interface (not shown in FIG. 7), or a mobile desktop environment (not shown in FIG. 7) to gain access to the server computer 700A.

The server computer 700A can be communicatively coupled to other computing environments (not shown in FIG. 7) and receive data regarding a participating user's interactions/resource network. In an illustrative operation, a user (not shown in FIG. 7) may interact with a computing application running on a client computing device 700B-700G to obtain desired data and/or perform other computing applications.

The data and/or computing applications may be stored on the server 700A, or servers 700A, and communicated to cooperating users through the client computing devices 700B-700G over an exemplary communications network 620. A participating user (not shown in FIG. 7) may request access to specific data and applications housed in whole or in part on the server computer 700A. These data may be communicated between the client computing devices 700B-700G and the server computer 700A for processing and storage.

The server computer 700A can host computing applications, processes and applets for the generation, authentication, encryption, and communication of data and applications, and may cooperate with other server computing environments (not shown in FIG. 7), third party service providers (not shown in FIG. 7), network attached storage ("NAS") and storage area networks ("SAN") to realize application/data transactions.

It should be appreciated that the computing architecture shown in FIG. 6 and the distributed network computing environment shown in FIG. 7 have been simplified for ease of discussion. It should also be appreciated that the computing architecture and the distributed computing network can include and utilize many more computing components, devices, software programs, networking devices, and other components not specifically described herein.

The disclosure presented herein also encompasses the subject matter set forth in the following clauses:

Clause 1. A computer-implemented method, comprising: executing a driver on a computing device, the driver comprising a plurality of modules, each of the plurality of modules comprising one or more callback functions, one or more public methods, one or more private methods, a module-specific configuration, one or more module attributes, and a private context; and executing a framework on the computing device, the framework configured to instantiate the plurality of modules of the driver, and pass callbacks received from an operating system to the plurality of modules that support the callbacks of the driver via at least one of the callback functions of the plurality of modules.

Clause 2. The computer-implemented method of clause 1, wherein at least some of the plurality of modules are parent modules configured to instantiate child modules, and wherein only parent and child modules can communicate directly.

Clause 3. The computer-implemented method of any of clauses 1 and 2, wherein at least some of the plurality of modules are parent modules configured to instantiate child modules, and wherein parent and child modules can communicate only through one or more public methods.

Clause 4. The computer-implemented method of any of clauses 1-3, wherein the driver further comprises driver-specific code that consumes functionality provided by the plurality of modules by way of one or more public methods.

Clause 5. The computer-implemented method of any of clauses 1-4, wherein the driver further comprises driver-specific code that calls the framework to instantiate the plurality of modules of the driver.

Clause 6. The computer-implemented method of any of clauses 1-5, wherein the framework passes the callbacks directly to the plurality of modules that support the callbacks.

Clause 7. The computer-implemented method of any of clauses 1-6, wherein the framework is further configured to create a relationship between at least two of the plurality of modules, the relationship defining only a parent-child relationship.

Clause 8. A computing device, comprising: one or more processors; and at least one computer storage medium storing an operating system, a framework, and at least one driver, the at least one driver comprising a plurality of modules, the modules comprising one or more callback functions, and wherein the framework, when executed by the one or more processors, is configured to instantiate the plurality of modules of the driver, and pass callbacks received from the operating system to the plurality of modules supporting the callbacks via at least one of the callback functions of the plurality of modules.

Clause 9. The computing device of clause 8, wherein the plurality of modules further comprise one or more public methods, wherein at least some of the plurality of modules are parent modules configured to instantiate child modules, and wherein the parent modules and child modules can communicate only through the one or more public methods.

Clause 10. The computing device of any of clauses 8 and 9, wherein the plurality of modules further comprise one or more module attributes, wherein at least some of the plurality of modules are parent modules configured to instantiate child modules, and wherein the module attributes of a child module specifies a parent module.

Clause 11. The computing device of any of clauses 8-10, wherein the plurality of modules further comprise one or more private methods and a private context, and wherein the one or more private methods are configured to store data in the private context.

Clause 12. The computing device of any of clauses 8-11, wherein the driver further comprises driver-specific code that consumes functionality provided by the plurality of modules by way of one or more public methods.

Clause 13. The computing device of any of clauses 8-12, wherein the driver further comprises driver-specific code that calls the framework to instantiate the plurality of modules of the driver.

Clause 14. The computing device of any of clauses 8-13, wherein the framework is further configured to create a relationship between at least two of the plurality of modules, the relationship comprising only a parent-child relationship.

Clause 15. At least one computer storage medium storing an operating system, a framework, and at least one driver, the at least one driver comprising a plurality of modules, the modules comprising one or more callback functions, and wherein the framework, when executed by one or more processors, is configured to instantiate the plurality of modules of the driver, receive callbacks from the operating system, and pass the callbacks received from the operating system to the plurality of modules of the driver that support the callbacks via at least one of the callback functions of the plurality of modules.

Clause 16. The at least one computer storage medium of clause 15, wherein the plurality of modules further comprise one or more public methods, wherein at least some of the plurality of modules are parent modules configured to instantiate child modules, and wherein the parent modules and child modules can communicate only through the one or more public methods.

Clause 17. The at least one computer storage medium of any of clauses 15 and 16, wherein the plurality of modules further comprise one or more module attributes, wherein at least some of the plurality of modules are parent modules configured to instantiate child modules, and wherein the module attributes of a child module specifies a parent module.

Clause 18. The at least one computer storage medium of any of clauses 15-17, wherein the plurality of modules further comprise one or more private methods and a private context, and wherein the one or more private methods are configured to store data in the private context.

Clause 19. The at least one computer storage medium of any of clauses 15-18, wherein the driver further comprises driver-specific code that consumes functionality provided by the plurality of modules by way of one or more public methods.

Clause 20. The at least one computer storage medium of any of clauses 15-19, wherein the plurality of modules expose data structures, device driver specific programming patterns, devices, or hardware buses.

Based on the foregoing, it should be appreciated that a driver module framework has been disclosed that enables the creation and execution of reliable and performant drivers. Although the subject matter presented herein has been described in language specific to computer structural features, methodological and transformative acts, specific computing machinery, and computer readable media, it is to be understood that the subject matter set forth in the appended claims is not necessarily limited to the specific features, acts, or media described herein. Rather, the specific features, acts and mediums are disclosed as example forms of implementing the claimed subject matter.

The subject matter described above is provided by way of illustration only and should not be construed as limiting. Various modifications and changes can be made to the subject matter described herein without following the example configurations and applications illustrated and described, and without departing from the scope of the present disclosure, which is set forth in the following claims.

What is claimed is:

1. A computer-implemented method, comprising:
executing a driver on a computing device, the driver comprising a plurality of modules, each of the plurality of modules comprising
one or more callback functions,
one or more public methods,
one or more private methods,
a module-specific configuration, one or more module attributes, and
a private context; and
executing a framework on the computing device, the framework configured to instantiate the plurality of modules of the driver, and
pass callbacks received from an operating system to the plurality of modules that support the callbacks of the driver via at least one of the callback functions of the plurality of modules.

2. The computer-implemented method of claim 1, wherein at least some of the plurality of modules are parent modules configured to instantiate child modules, and wherein only parent and child modules can communicate directly.

3. The computer-implemented method of claim 1, wherein at least some of the plurality of modules are parent modules configured to instantiate child modules, and wherein parent and child modules can communicate only through one or more public methods.

4. The computer-implemented method of claim 1, wherein the driver further comprises driver-specific code that consumes functionality provided by the plurality of modules by way of one or more public methods.

5. The computer-implemented method of claim 1, wherein the driver further comprises driver-specific code that calls the framework to instantiate the plurality of modules of the driver.

6. The computer-implemented method of claim 1, wherein the framework passes the callbacks directly to the plurality of modules that support the callbacks.

7. The computer-implemented method of claim 1, wherein the framework is further configured to create a relationship between at least two of the plurality of modules, the relationship defining only a parent-child relationship.

8. A computing device, comprising:
one or more processors; and
at least one computer storage medium storing
a driver comprising a plurality of modules, each of the plurality of modules comprising
one or more callback functions,
one or more public methods,
one or more private methods,
a module-specific configuration,
one or more module attributes, and
a private context; and
a framework configured to
instantiate the plurality of modules of the driver, and
pass callbacks received from an operating system to the plurality of modules that support the callbacks via at least one of the one or more callback functions of the plurality of modules.

9. The computing device of claim 8, wherein at least some of the plurality of modules are parent modules configured to instantiate child modules, and wherein only parent and child modules can communicate directly.

10. The computing device of claim 8, wherein at least some of the plurality of modules are parent modules configured to instantiate child modules, and wherein parent and child modules can communicate only through one or more public methods.

11. The computing device of claim 8, wherein the driver further comprises driver-specific code that consumes functionality provided by the plurality of modules by way of one or more public methods.

12. The computing device of claim 8, wherein the driver further comprises driver-specific code that calls the framework to instantiate the plurality of modules of the driver.

13. The computing device of claim 8, wherein the framework passes the callbacks directly to the plurality of modules that support the callbacks.

14. The computing device of claim 8, wherein the framework is further configured to create a relationship between at least two of the plurality of modules, the relationship defining only a parent-child relationship.

15. A system, comprising:
one or more processors; and
a computer-readable medium having encoded thereon computer readable instructions to cause the one or more processors to perform operations comprising:
executing a driver comprising a plurality of modules, each of the plurality of modules comprising
one or more callback functions,
one or more public methods,
one or more private methods,
a module-specific configuration,
one or more module attributes, and
a private context; and
executing a framework configured to
instantiate the plurality of modules of the driver, and
pass callbacks received from an operating system to the plurality of modules that support the callbacks via at least one of the one or more callback functions of the plurality of modules.

16. The system of claim 15, wherein at least some of the plurality of modules are parent modules configured to instantiate child modules, and wherein only parent and child modules can communicate directly.

17. The system of claim 15, wherein at least some of the plurality of modules are parent modules configured to instantiate child modules, and wherein parent and child modules can communicate only through one or more public methods.

18. The system of claim 15, wherein the driver further comprises driver-specific code that consumes functionality provided by the plurality of modules by way of one or more public methods.

19. The system of claim 15, wherein the driver further comprises driver-specific code that calls the framework to instantiate the plurality of modules of the driver.

20. The system of claim 15, wherein the framework passes the callbacks directly to the plurality of modules that support the callbacks.

* * * * *